Feb. 8, 1938. H. E. GRAY 2,107,293
MACHINE FOR DICING FRUIT AND THE LIKE
Filed Oct. 12, 1931 2 Sheets-Sheet 1
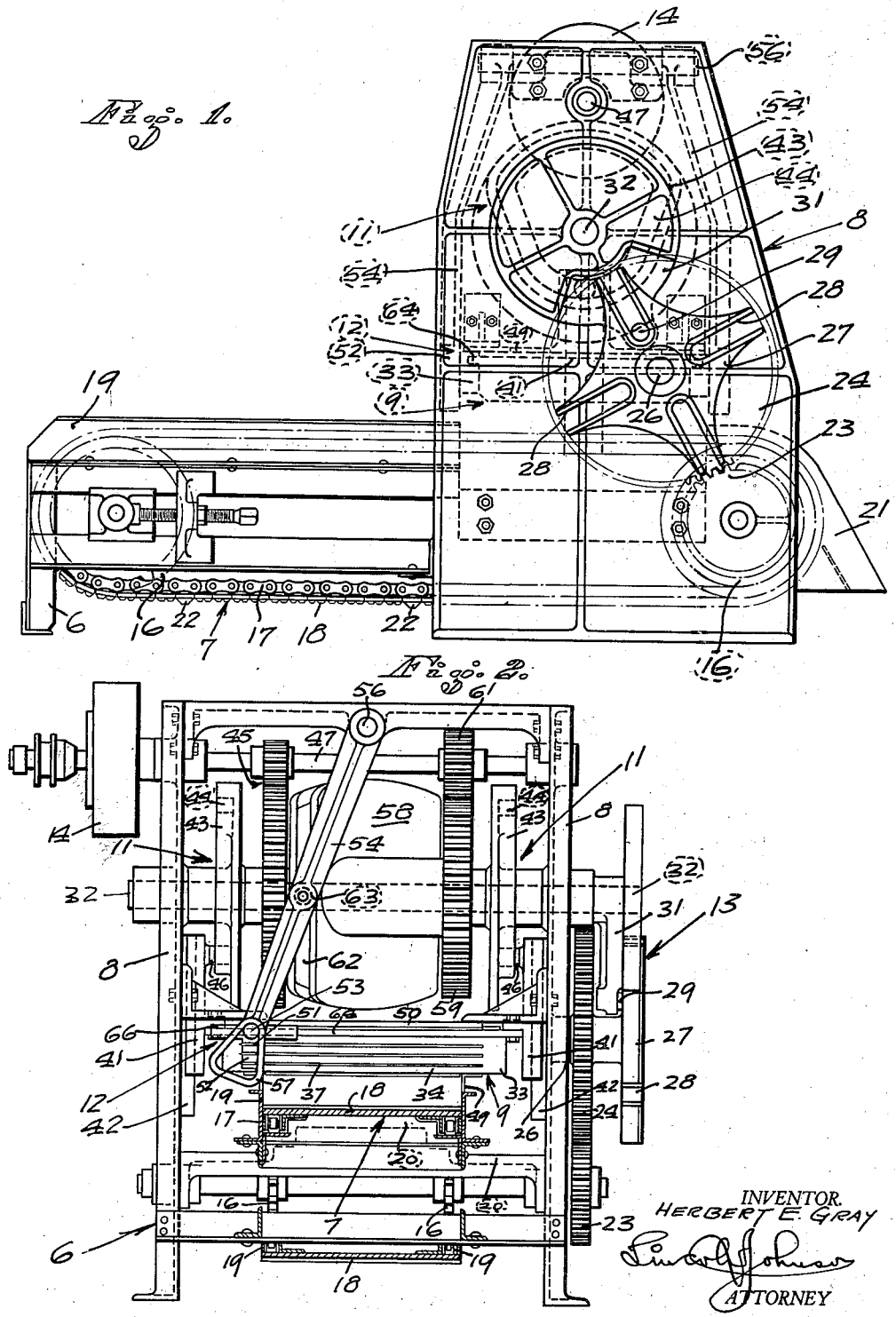
INVENTOR.
HERBERT E. GRAY
ATTORNEY

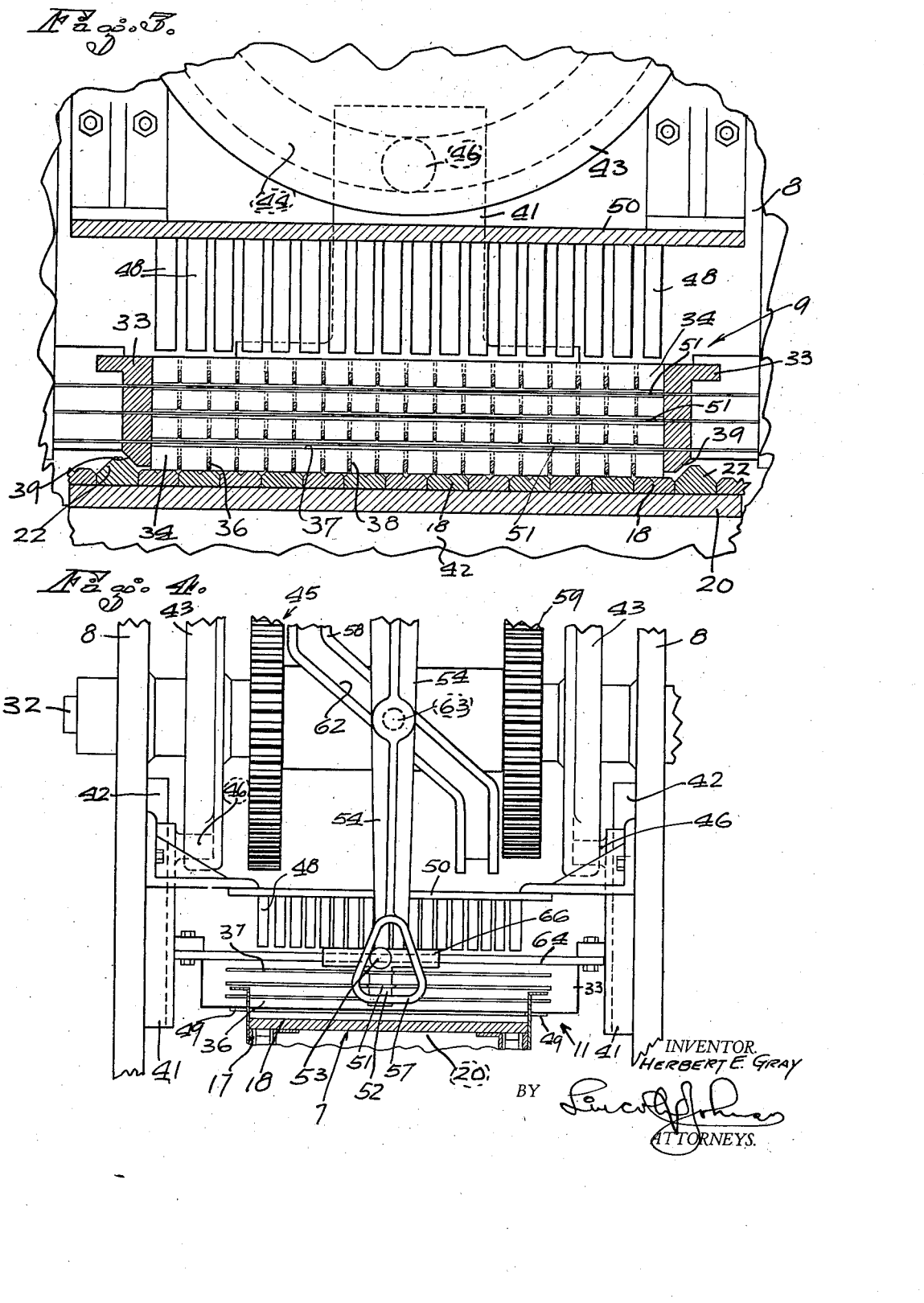

Patented Feb. 8, 1938

2,107,293

UNITED STATES PATENT OFFICE 2,107,293

MACHINE FOR DICING FRUIT AND THE LIKE

Herbert E. Gray, San Jose, Calif.

Application October 12, 1931, Serial No. 568,293

21 Claims. (Cl. 146—78)

The invention relates to dicing or slicing machines, and particularly to fruit dicing machines.

The primary object of the invention is to provide an apparatus whereby large quantities of fruit or other similar material may be cut into cubes efficiently, and in continuous operations, each operation dicing a comparatively large mass or quantity of fruit.

Another object of the invention is to provide a dicer in which a cutter is provided to cut the fruit or other material into column-like portions, and a transversely cutting set of blades being provided to cut across said portions while the fruit is confined in the cutter; means being provided to actuate the various cutters and sets of blades in synchronism; and means being also provided to intermittently feed layers of fruit below the cutters.

Other objects and advantages are to provide a machine for dicing fruit and the like that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings, wherein—

Fig. 1 is a side view of the machine constructed in accordance with my invention.

Fig. 2 is an end view of the machine, partly in section.

Fig. 3 is a sectional view of the dicing elements of the machine, in cutting position.

Fig. 4 is an end view of the dicer mechanism and its actuating cams.

In carrying out my invention, I make use of a frame 6 on which is supported a horizontally arranged, endless conveyor 7 to carry the fruit thereon, in one layer or in a plurality of layers, one on the top of the other. A vertical frame structure 8 is provided adjacent an end of the conveyor 7. A vertical cutter 9 and its reciprocating mechanism 11 are supported on the frame structure 8. A transversely acting slider mechanism 12 is also supported on the cutter 9 and on the structure 8. The conveyor 7 is driven by an intermittent driving mechanism 13. A pulley 14 connected to a power unit drives all the moving mechanisms of the machine in synchronism with each other.

In general, the machine operates as follows: the fruit is spread in one or more layers over the top of the conveyor 7 and is carried below the cutter 9. The cutter 9 is then lowered. The cutter 9 is adapted to cut the fruit therebelow into column-like portions. When the cutter 9 thus confines column-like portions of the quantity of fruit, the transversely acting slicer mechanism 12 is moved across the cutter to cut across the fruit columns in the latter, thereby dicing the same. Thereafter the cutter 9 and the slicer 12 are lifted together away from the top of the conveyor 7 and the latter is moved ahead to discharge the diced fruit at its farthest end and to bring another mass of material or fruit into registry with the cutter 9. The above operations are performed repeatedly and automatically, and the only control necessary is the spreading of fruit onto the top of the conveyor 7.

In detail the endless conveyor 7 is supported on sprockets 16 adjustably mounted on the frame 6 in the usual manner. The conveyor 7 itself consists of a pair of parallel endless chains 17 engaging the respective sprockets 16, and of transversely extended flat bars 18 secured to opposed links of the chains 17 to form a flexible supporting surface to carry the fruit. The bars 18 may be made of suitable metal, wood, or hard rubber, or any suitable composition adapted to form a platform for the cutting operation.

Alongside each edge of the top of the conveyor 17 is a shield 19 secured on the frame 6 to prevent the sliding off of the fruit from the conveyor 7. The shields 19 extend to the cutter 9. Alongside the discharge end of the conveyor 7 is arranged a chute 21 extending from the cutter 9 rearwardly to receive and guide the diced fruit to a suitable receptacle.

Longitudinally spaced protuberances 22 are provided on the conveyor 7. The protuberances 22 are arranged in opposed pairs at the opposite edges of the conveyor 7 and the pairs are longitudinally spaced from each other to a distance equal to the length of the cutter 9.

The conveyor 7 is advanced intermittently. Each advancing movement of the conveyor 7 is of the same length as the longitudinal spacing of the protuberances 22. At the start the conveyor 7 is in a position to align two adjacent pairs of protuberances 22 with the respective ends of the cutter 9, so that after each advancement of the conveyor 7 two adjacent pairs of protuberances 22 are aligned with the ends of the cutter 9. A platform 20 is fixed below the cutter 9 so that the conveyor 7 moves thereover. Thus the portion of the conveyor 7 on which the cutter 9 works, is stiffened.

The conveyor 7 is driven by a gear 23 on the shaft of the sprockets 16 at the discharge end of the conveyor 7. The gear 23 is in mesh with another gear 24 on another shaft 26 journaled in the vertical frame member 8 on one side of the conveyor 7. The gear 24 is fixed to a driven wheel 27 of a Geneva driving mechanism. The wheel 27 has four cogs 28 to be engaged successively by a pin 29 extended from a driving disc 31 parallel with the wheel 27 and continuously rotated by a rotary shaft 32, the latter being extended across the upright frame members 8 and being journaled therein at both ends. The connection between the disc 31 and the wheel 27 through the pin 29 and cogs 28 is such that the pin slides into and out of one of the cogs 28 during each revolution of the disc 31, thereby giving positive but intermittent motion to the wheel 27, but preventing the moving of the wheel 27 in either direction without the driver disc 31. It also prevents complete revolution of the driven wheel 27 for each revolution of the disc 31. The wheel 27 is moved one quarter of a revolution for each complete revolution of the shaft 32. The ratio of the gears 24 and 23 is such that a quarter revolution of the wheel 27 advances the conveyor 7 to the required distance. Then the conveyor 7 is at a standstill until the pin 29 is brought into engagement with the successive cog 28.

The cutter 9 consists of a cutter frame 33 in which are fixed two sets of cutter blades 34 and 36. The blades 34 extend transversely above the conveyor 7 while the blades 36 extend longitudinally above the conveyor 7 and across the blades 36. Each blade 34 and 36 is made in vertically spaced sections with a slot or clearance 37 between adjacent sections. The sections of the longitudinal blades 36 are secured into the blades 34 and they cross by lap joints 38 formed by interlocking kerfs in the respective blades. In this manner the space inclosed by the cutter frame 33 is divided into a plurality of column-like spaces with slots in the sides thereof. The lower edges of the blades 34 and 36 and also the lower edges of the blade sections are sharpened to form cutting edges. The lower corners 39 of the cutter frame 33 are beveled to fit over the beveled sides of the respective protuberances 23 on the conveyor 7.

From the opposite sides of the cutter frame 33 extend slides 41 which are guided on vertical guides 42 on the inside of the upright frame members 8, so as to guide the entire cutter 9 in its reciprocating movement toward and away from the conveyor 7.

The reciprocating mechanism 11 includes a cam disc 43 inside of and adjacent to each slide 41. The cam discs 43 are keyed on the shaft 32 to rotate therewith. In the face of each cam disc 43 facing the adjacent slide 41 is a cam groove 44. Each slide 41 has a pin 46 extended inwardly from its top and into the adjacent cam groove 44. The eccentric grooves 44 of the opposite cam discs 43 are aligned so as to raise and lower the slides 41 as the shaft 32 is rotated. Consequently as the shaft 32 is rotated, it rotates the discs 43 and raises and lowers the slides 41 thereby reciprocating the cutter 9 once for each revolution of the shaft 32. The Geneva motion of the disc 31 is so adjusted on the end of the shaft 32 that it moves the conveyor 7 when the cutter 9 is raised, so as to discharge the cubed or diced fruit and bring uncut fruit below the cutter 9.

The shaft 32 is driven through a gear and pinion drive 45 from a drive shaft 47 journaled in the upright frame member 8. The shaft 47 is connected to a prime mover by the pulley 14 keyed thereon, or by other suitable drive mechanism.

Ejector bars 48 are fixedly extended vertically from a support 50 fastened to the upright frame member 8. The bars 48 are in registry with the column-like spaces formed by the blades 34 and 36. When the cutter 9 is raised it is moved over said bars 48 so that the latter eject the cut fruit that might adhere to the blades 34 and 36.

The cutter frame 33 has an apron 49 extended downwardly from each longitudinal side thereof in continuation of the planes of the shields 19 to prevent the sidewise dropping of the fruit from the conveyor 7 below the cutter 9. The apron shields 49 clear the edges of the conveyor 7 to allow the vertical movement of the former with the cutter frame 33.

The transverse slicing or dicing of the fruit is performed after the cutter 9 is lowered onto the conveyor 7. The transversely slicing mechanism 12 includes a plurality of double edged blades 51 slidably guided in the respective clearance slots 37. The blades 51 are united together at each end by a head 52, so as to extend longitudinally above the conveyor 7, but cut transversely in a plane parallel with the top of the said conveyor 7. Each blade 51 has substantially the width of a hack saw blade and is formed with a cutting edge at each longitudinal edge thereof. It is to be noted that the slots 37 extend at both ends thereof, into the cutter frame 33 beyond the respective edges of the conveyor 7 so as to accommodate the blades 51 therein in an out of way position relatively to blades 34 and 36 of the cutter 9.

A pin 53 extends outwardly from each head 52. A swinging arm 54 is fixed on each end of a rocking shaft 56 which latter is journaled on the top of the upright frame 8. The arms 54 extend downwardly, one in the front and the other in the rear of the cutter frame 9. The free end of each arm 54 terminates in a triangular loop 57, the base of each triangular loop 57 being disposed toward the conveyor 7. The pins 53 extend into the respective loops 57 so as to be engaged by said loops 57 as the arms 54 are swung in either direction, yet allow the pins 53 to move upwardly and downwardly in the loops 57 as the cutter 9 is raised or lowered.

The arms 54 are swung by a cam 58. The cam 58 is freely rotatable on the middle portion of the shaft 32 and is fixed to a gear 59 also rotatable on the shaft 32. The gear 59 is driven by a pinion 61, which latter is fixed on the shaft 47.

The cam 58 has a peripheral cam groove 62 thereon into which extends a pin and roller connection 63 from one of the arms 54. The groove 62 has, at the opposite sides and ends of the cam 58, straight and vertical portions, and oppositely inclined diagonal groove portions connecting the ends of said straight portions. Thus while the straight groove portions ride over the pin and roller 63, the arm 54 is held at an end of its stroke in an out of way position. When the inclined portions ride over the pin and roller 63, the arm 54 is swung across the entire width of the cutter frame 33. The swinging of one arm 54 rocks the shaft 56 and simultaneously swings the other arm 54 therewith so that both heads 52 are engaged and moved simultaneously, carrying the blades 51 across the slots 37 to cut across the column-like fruit portions confined between the blades 34 and 36. The gear 59 and pinion 61 are designed in such ratio that the arms 54 are swung once each time the cutter 9 is lowered onto the conveyor 7. Hence the blades 51 slice in opposite directions during successive slicing operations.

The heads 52 are positively guided on a lineal path by transverse guide flanges 64 on the cutter frame 33 which are slidably engaged by suitably recessed or grooved, enlarged ends 66 of the heads 52.

The aforedescribed machine efficiently cuts fruit or the like into cubes of desired sizes by continuous and well synchronized operation. The fruit or the like can be spread on the conveyor as the machine is in operation and is automatically carried to the cutter 9 which cuts in columns; thereafter the slicer 12 is swung across automatically to slice the fruit into cubes. Then the cutter 9 and slicer 12 are automatically raised and the conveyor 7 again advanced so as to repeat the dicing operation. The machine is positive in operation, it does not require any elaborate adjustment nor manual control therefore it readily lends itself to effective application by the labor ordinarily available.

Having thus described this invention, what I claim and desire to secure by Letters Patent is:

1. In an apparatus of the character described, a conveyor, a reciprocating cutter supported above the conveyor to be moved onto the conveyor and cut the material carried on the conveyor, said cutter being formed of a plurality of blades arranged in intersecting rows and having transverse aligned guide-slots formed in the blades, another set of blades movable across the blades of said cutter in said slots to cut across the material in the cutter, means to intermittently move the conveyor to said cutter, means to reciprocate said cutter when the conveyor is stopped therebelow; and means to swing the transverse blades across said cutter when the latter is in cutting position, each of the said set of blades being double edged to cut when swung in either direction.

2. In an apparatus of the character described, a conveyor, a reciprocating cutter above the conveyor to cut the material carried by said conveyor, guides through the cutter, a set of blades movable through said guides across the cutter to cut transversely through the material confined in said cutter, means to intermittently move the conveyor so that each movement of the conveyor advances the conveyor surface to a distance substantially equal with the length of the cutter, means operated in synchronism with the conveyor to lower the cutter onto the conveyor after each intermittent movement, and means operated in synchronism with the reciprocation of the cutter to swing the set of transverse blades across the cutter when the latter is in cutting position on the conveyor.

3. The combination with a frame, a cutter thereon having intersecting fixed blades and transverse guides through the blades, of a set of transversely cutting blades having opposed cutting edges, and being movable through said guides, means to hold the transverse blades in fixedly spaced position in the guides; swinging arms on the frame, one at each end of said set of blades, and self-adjustable means of connection between the swinging arms and said blade holding means to allow the swinging of the blades across the cutter with said arms, yet allow the movement of the set of blades with the cutter.

4. A fruit dicer comprising a frame, a conveyor, a vertically movable cutter frame on the first frame being reciprocated above a portion of the conveyor, two sets of blades in the cutter frame, one set being arranged across the other to cut the mass of fruit on the conveyor into a plurality of column-like portions, the sets of blades having aligned slots therethrough extending at right angles to the direction of the cutter movement, a third set of blades slidable in said slots to cut across the said column-like portions of the mass of fruit on the conveyor, the blades of the third set being double edged to cut in either direction and being movable into an out of way position relatively to the blades in the cutter; swinging arms extended from the frame, one at the rear, the other at the front of the cutter frame, a loop at the free end of each arm; an element tying the ends of the third set of blades together, each element being adapted to be engaged by said loop and swung by the arms, and being also movable in the loop when the cutter frame is reciprocated; means to intermittently move the conveyor the length of the cutter frame; means to reciprocate the cutter frame after each movement of the conveyor; and means to swing the arms and the third set of blades across the first sets of blades when the latter are upon the conveyor.

5. A fruit dicing mechanism comprising a movable fruit supporting member, a member having pockets with fruit cutting edges at one side thereof, a cutter member movable transversely of said member having pockets, discharge means registering with said pockets, and means for actuating said member having pockets to divide fruit on said supporting member and to receive the divided fruit into said pockets, means for actuating said transversely movable cutter member to divide the fruit in said pockets into sections, means telescoping said pocket discharge means and said pockets to free the latter of the fruit sections and deposit such sections upon said supporting member, and means for advancing said supporting member after the fruit sections are deposited thereon.

6. Fruit dicing mechanism comprising an actuated fruit conveyor, a cutter having a cellular arrangement of cutting blades disposed in parallel relation to form parallel, hollow columns, said blades at spaced apart intervals transversely of said hollow columns being separated to form spaced apart clearances, a second cutter movable relatively to said first blades in a direction normal and relatively to the movement of said first cutter, cutter discharge means, and means for actuating said conveyor and for actuating said cutters in a selected sequence whereby said cutters operate one following the other, and means for actuating said cutter discharge whereby the fruit cut is discharged onto said conveyor by said discharge means and advanced by said conveyor away from said cutters.

7. Fruit dicing mechanism comprising a movable support for a layer of fruit, a cutting device having pockets and movable toward and away from said support, said cutting member dividing fruit on said support into columns and supporting such columns in said pockets, a second cutting device movable across said support and through said first fruit cutting member to divide the columns of fruit in said pockets into cubes, an ejector in the path of the pockets in said first mentioned cutting member, and actuating means for advancing a section of said support to a position beneath said first mentioned cutting member, means for moving said first cutting member toward such section of said support, means for moving said second cutting device through the pockets of said first cutting member, means for moving said first cutting member away from said support and telescoping the pockets in said first cutting member over said ejector, and means for advancing said support to present another section thereof for registry with said first cutting member.

8. In combination, a movable support for fruit, opposed guide means on said support for maintaining fruit against displacement therefrom, a reciprocating cutter comprising a plurality of pockets and having a transverse dimension slightly less than the transverse dimension of said opposed guide means, means for moving said cutter between said guide means and into proximity with said support, a second cutter operable through the pockets in said first cutter when said first cutter is in proximity to said support, and an ejector for each of said pockets, the means for moving said first cutter retracting said first cutter telescopingly upon said ejectors.

9. In combination, an intermittently movable conveyor for supporting a layer of fruit and adapted to be advanced a predetermined distance at each movement, opposed guide members for preventing the displacement of fruit from said conveyor, a reciprocating member having a plurality of cells with cutting edges at one side thereof, a second cutter movable transversely of the cells in said reciprocating member when the latter is in proximity to said support, ejectors registering with each of said cells and effective when said reciprocating member is moved away from said support, and means for actuating said conveyor to register successive sections thereof with said reciprocating member, moving said reciprocating member into proximity with said successive sections of said conveyor one at a time, actuating said second cutter at each registration of said reciprocating member with a section of said conveyor and lifting said reciprocating cutter to render said ejectors effective preliminary to each succeeding movement of said conveyor.

10. An automatic fruit dicing machine comprising a reciprocating receptacle having pockets having spaced transverse slots with cutting edges at one side thereof forming parallel, hollow columnar pockets divided transversely by the spaced slots, means for reciprocating said receptacle, a transverse cutting member having blades registering with the slots in said pockets, means for moving said transverse cutting member through said slots, ejector means in the path of said pockets and effective as said receptacle approaches a predetermined position to clear said pockets of adhering material.

11. In a material dicing machine, the combination of a transversely slotted cellular receptacle having cutting edges at one side thereof, means for moving said receptacle toward and away from material to be diced, a second cutting member having cutting edges complemental to the slots in said receptacle, means for moving said second member transversely through the slots of said receptacle, and means for moving said second cutting member bodily with said receptacle and means operating in synchronism with the movement of said cutters for automatically discharging the cut material from said receptacle after the movement of said second cutter through the slots of said receptacle.

12. In an automatic fruit or vegetable dicing machine, the combination of means forming a support for a body of fruit or vegetable to be diced, two cutting members, one of said cutting members forming a receptacle having elongated parallel extending cells, said cells and receptacle having spaced apart transversely extending slots, the other of said cutting members comprising a plurality of spaced apart parallel cutting edges disposed in registration with the slots of said first cutting member, means for moving the two cutting members bodily together to cause the cellular cutter to form the same into elongated columns, means for moving the second cutter relatively to the first cutter and through the slots of said first cutter to slice the elongated columns of material, and means for moving said cutters bodily away from said cutting platform whereby to leave the diced material in cut position and free of both cutters.

13. In an automatic fruit or vegetable dicing machine, the combination of means forming a support for a body of fruit or vegetable to be diced, two cutting members, one of said cutting members forming a receptacle having elongated parallel extending cells, said cells and receptacle having spaced apart transversely extending slots, the other of said cutting members comprising a plurality of spaced apart parallel cutting edges disposed in registration with the slots of said first cutting member, means for moving the two cutting members bodily together to cause the cellular cutter to form the same into elongated columns, means for moving the second cutter relatively to the first cutter and through the slots of said first cutter to slice the elongated columns of material, means for moving said cutters bodily away from said cutting platform whereby to leave the diced material in cut position and free of both cutters, and ejector mechanism operable during the last mentioned movement of the cutters for ejecting the cut material from the cellular cutter.

14. An automatic machine for dicing material comprising the combination of a stationary base, a material holding conveyor movably mounted on said base, means for moving said conveyor along a predetermined path relative to said base, a first cutter movably mounted on said base, said cutter being of cellular construction moving in a direction transverse to the movement of said conveyor, said cutter being provided in such transverse direction with spaced apart relatively narrow slots, means for moving said elongated cutter from a position relatively remote from said platform to a cutting position adjacent said platform and back to its original position in cyclic intermittent movement whereby when in cutting position it will cut material on said platform into elongated strips of cellular-like cross-section corresponding to the cross-sectional shape of the cells of the cutter, a second cutter having a plurality of spaced apart blades, each one of the blades registering with one of the slots of the cellular cutter, and means for reciprocating said second cutter across the slots of said first cutter whereby to slice the elongated cellular-like sections of material into a plurality of shorter sections, said means including mechanism for moving said second cutter bodily with the cellular cutter when the latter approaches and recedes from the material and for moving said second cutter relatively to said first cutter when said first cutter has cut the elongated strips from the material and is in a stationary position.

15. An automatic machine for dicing material comprising the combination of a stationary base, a material holding conveyor movably mounted on said base, means for moving said conveyor along a predetermined path relative to said base, a first cutter movably mounted on said base, said cutter being of cellular construction elongated in a direction transverse to the movement of said conveyor, said cutter being provided in such transverse direction with spaced apart relatively narrow slots, means for moving said cutter from a position relatively remote from said platform to a cutting position adjacent said platform and back to its original position in cyclic intermittent movement whereby when in cutting position it will cut material on said platform into elongated strips of cellular-like cross-section corresponding to the cross-sectional shape of the cells of the cutter, a second cutter having a plurality of spaced apart blades, each one of the blades registering with one of the slots of the cellular cutter, means for reciprocating said second cutter across the slots of said first cutter whereby to slice the elongated cellular-like sections of material into a plurality of shorter sections, said means including mechanism for moving said second cutter bodily with the cellular cutter when the latter approaches and recedes from the material and for moving said second cutter relatively to said first cutter when said first cutter has cut the elongated strips from the material and is in a stationary position, means for intermittently moving the conveyor in synchronized relation to the movement of the cutting knives whereby said conveyor will be moved to bring fresh material into cutting position when the first and second knives have been shifted away from cutting position, and ejector means operable to eject the cut material from the cellular cutter between two successive cutting operations of the first mentioned cutter and between two successive intermittent movements of the platform.

16. A dicer comprising a first cutter comprising relatively stationary blades arranged in sections and disposed angularly one with respect to the other and spaced apart to form clearances between said sections, the blades of said sections being in registration and forming a cellular construction, and another set of blades operatively related to the blades of the sections and movable through the clearances between the respective sections to cut at an angle to the blades of the sections, a supporting surface for an object to be cut by the movement of the blades, means to reciprocate the blades toward and from the supporting surface and means to eject the cut objects from the blades of the sections when the blades are raised away from the supporting surface.

17. In a material dicing machine, the combination of a transversely slotted cellular receptacle having cutting edges at one side thereof, the cells of the receptacle forming parallel hollow columns, said receptacles being formed with transversely disposed, spaced apart slots, conveying means for moving material to be diced into registration with said cellular receptacle, means for moving said receptacle toward and away from said material when fed into position by said conveyor, a second cutting member having cutting edges complemental to the slots in said receptacle, means for moving said second member transversely through the slots of said receptacle and means for moving said second member bodily with said receptacle.

18. A material dicing machine comprising a cellular receptacle having cutting edges at one side thereof, said receptacle forming parallel cellular columns, said columns being provided with spaced apart slots disposed transversely of the longitudinal length of the columns, means for causing the cutting edges to move relatively to a body of material to be diced to cause said material to be cut and to fill said columns, a second cutting member having cutting edges complemental to the slots in said receptacles and means for moving said second member transversely through the slots of said receptacle, and means adapted to be projected through said hollow column after the passage of said second cutter transversely through said slots for discharging the cut material from said cells, and mechanism for operating said plurality of means in definite synchronism and sequence.

19. In a material dicing machine, the combination of a support, a conveyor adapted to move horizontally across said support, means for moving said conveyor intermittently for feeding material to be diced to a dicing station, cellular means disposed at said dicing station comprising a plurality of angularly disposed knives in cellular formation to provide parallel, vertical, tubular column-like passages having their lower ends formed as cutters, said knives being provided with transversely disposed slots spaced apart vertically, means for raising and lowering said cellular knives to cause said knives to recede from and approach said conveyor, a series of horizontally disposed knives mounted to register with the slots in said cellular knives, means for moving said horizontal knives transversely through the slots of said cellular knives to cut the column of material in said hollow columns into smaller shapes, and a plurality of discharge members disposed normally above the cellular knives and in registration with the hollow, tubular passages and means for moving said discharge means and said cellular knives relatively to cause the discharge of said smaller cut pieces from said cellular passages.

20. A dicer comprising a plurality of rows of relatively fixed, angularly disposed cutting blades arranged in spaced parallel relation and having spaces within the cutting blades entirely unobstructed, means to support an article to be cut on one side of the blades, means for moving the blades and article relatively to force the article to be cut into the unobstructed spaces within the cutting blades to thereby cut said article to column-like sections, and knives positioned to operate in the spaces between the relatively fixed cutting blades and movable transversely thereacross to cut the column-like sections of the article into cubes without obstructing the relatively fixed cutting blades, and means automatically synchronized to act with the means for moving the blades and the article relatively whereby to cause the knives to move in the spaces between the relatively fixed cutting blades after the relative movement between the first mentioned blades and the article to be cut.

21. In a material dicing machine, the combination of means forming a cellular structure, the cells of which are substantially elongated relatively to their cross section, the end walls of the cells of the structure forming material cutting means, means for causing relative motion between material to be diced and said cellular structure whereby to cause the cutting means to cut the material into elongated cellular columns, said cellular structure being formed with transversely disposed spaced apart slots, additional cutting means comprising spaced cutting knives each adapted to move through one of said slots, means for automatically shifting said knives after the formation of said elongated columns whereby to cut the individual columns transversely into smaller pieces, plunger means supported in registration with the elongated cells of the structure, and means for effecting relative movement between the plunger means and said elongated cells after the movement of said spaced cutting knives transversely of said cells whereby to discharge the cut material from said cells.

HERBERT E. GRAY.